(12) United States Patent
Cosolo

(10) Patent No.: US 10,641,023 B2
(45) Date of Patent: May 5, 2020

(54) DEVICE FOR OPENING/CLOSING A DOOR OF A WASHING MACHINE, PARTICULARLY FOR WASHING EQUIPMENT USED IN THE FIELD OF PHARMACEUTICAL RESEARCH AND/OR PHARMACEUTICAL PRODUCTION, AND MACHINE COMPRISING SAID DEVICE

(71) Applicant: IWT S.R.L., Casale Litta (VA) (IT)

(72) Inventor: Maurizio Cosolo, Magenta (IT)

(73) Assignee: IWT S.R.L., Casale Litta (VA) (IT)

( * ) Notice: Subject to any disclaimer, the term of this patent is extended or adjusted under 35 U.S.C. 154(b) by 0 days.

(21) Appl. No.: 16/119,535

(22) Filed: Aug. 31, 2018

(65) Prior Publication Data

US 2019/0071909 A1 Mar. 7, 2019

(30) Foreign Application Priority Data

Sep. 4, 2017 (IT) .............................. 102017000098922

(51) Int. Cl.
| | | |
|---|---|---|
| *E05D 15/06* | (2006.01) | |
| *B08B 13/00* | (2006.01) | |
| *B08B 3/04* | (2006.01) | |
| *A01K 1/03* | (2006.01) | |
| *E05D 15/58* | (2006.01) | |

(Continued)

(52) U.S. Cl.
CPC .......... *E05D 15/0621* (2013.01); *A01K 1/031* (2013.01); *A01K 1/035* (2013.01); *B08B 3/04* (2013.01); *B08B 13/00* (2013.01); *E05D 15/58* (2013.01); *E05F 1/002* (2013.01); *E05F 1/1091* (2013.01); *E05Y 2900/312* (2013.01); *E05Y 2900/608* (2013.01)

(58) Field of Classification Search
CPC . D06F 39/14; D06F 2224/00; E05D 15/0621; E05D 15/58; E05F 1/002; E05F 1/1091; E05Y 2900/312; E05Y 2900/608; B08B 3/04; B08B 13/00
USPC .......... 49/158–160, 176–180, 188–189, 260, 49/319–321
See application file for complete search history.

(56) References Cited

U.S. PATENT DOCUMENTS 3,277,907 A  10/1966  Goldman
5,369,912 A * 12/1994  Ginzel .................. E05B 65/102
                                                49/141

(Continued)

FOREIGN PATENT DOCUMENTS

DE   102016215649 A1 *  2/2018  ............. E05D 15/56
EP   2 564 945 A1       3/2013

(Continued)

OTHER PUBLICATIONS

Italian Search Report dated Mar. 2, 2018, issued in IT Application No. 201700098922.

*Primary Examiner* — Andrew M Roersma
(74) *Attorney, Agent, or Firm* — Workman Nydegger

(57) ABSTRACT

A washing machine adapted for washing equipment used in the field of pharmaceutical research and/or pharmaceutical production is described, which includes an inner compartment and a front wall having a door allowing access to the inner compartment and a device for opening/closing the door, the device for opening/closing the door includes components for imparting a lateral rotational-translational motion to the door relative to the front wall, thereby effecting the opening/closing action.

14 Claims, 5 Drawing Sheets

(51) Int. Cl.
*E05F 1/00* (2006.01)
*E05F 1/10* (2006.01)
*A01K 1/035* (2006.01)

(56) References Cited

U.S. PATENT DOCUMENTS

| | | | | |
|---|---|---|---|---|
| 7,614,263 B2 * | 11/2009 | Kim | ............... | F24C 15/02 |
| | | | | 68/12.26 |
| 2011/0226285 A1 * | 9/2011 | Savoia | ............... | B08B 3/02 |
| | | | | 134/21 |
| 2013/0098407 A1 * | 4/2013 | Perlman | ............... | A61B 1/123 |
| | | | | 134/36 |

FOREIGN PATENT DOCUMENTS

| | | | | |
|---|---|---|---|---|
| EP | 2 932 879 A1 | 10/2015 | | |
| EP | 3 109 388 A1 | 12/2016 | | |
| KR | 20150123434 A | * 11/2015 | ............... | B08B 3/02 |
| WO | 00/77333 A1 | 12/2000 | | |

* cited by examiner

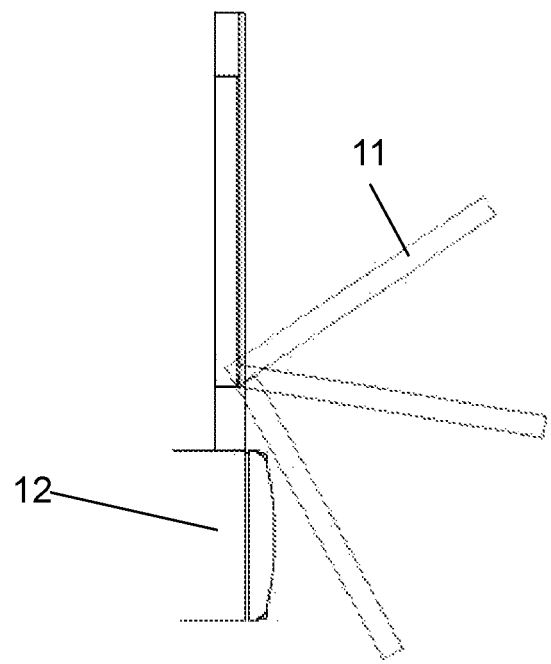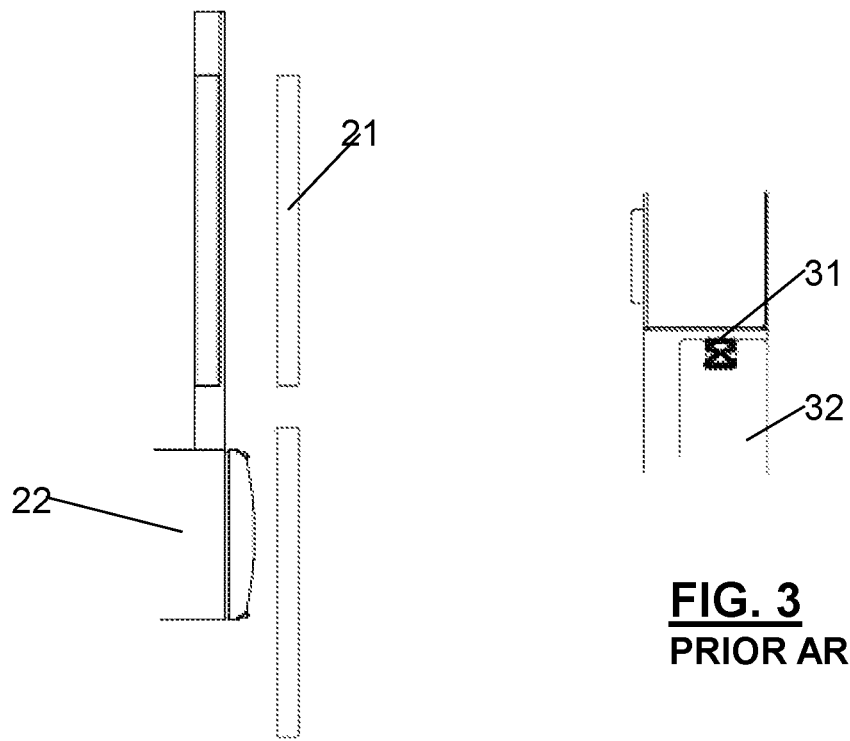
FIG. 1 PRIOR ART
FIG. 2 PRIOR ART
FIG. 3 PRIOR ART

DEVICE FOR OPENING/CLOSING A DOOR OF A WASHING MACHINE, PARTICULARLY FOR WASHING EQUIPMENT USED IN THE FIELD OF PHARMACEUTICAL RESEARCH AND/OR PHARMACEUTICAL PRODUCTION, AND MACHINE COMPRISING SAID DEVICE

CROSS-REFERENCE TO RELATED APPLICATIONS

This application claims priority to Italian Application No. 102017000098922 filed Sep. 4, 2017, which is incorporated herein by reference.

BACKGROUND OF THE INVENTION

Field of the Invention

The present invention relates to a device for opening/closing a door of a washing machine, particularly for washing equipment used in the field of pharmaceutical research and/or pharmaceutical production, and to a machine comprising said device.

Background Art

In the field of pharmaceutical research and production, particularly in the field of animal breeding departments and their washing areas, where laboratory animals are bred, and also in the washing areas of companies producing pharmaceutical products and active principles, the problem of the available spaces is becoming increasingly important and represents a considerable cost when new buildings are planned.

When preparing the layouts of the washing areas and designing the building, it is necessary to take into account not only the positions of the various machines, but also those of accessories such as carrier racks.

If we consider, for example, the large washing machines commonly called "rack washers", which are normally used for washing animal breeding cages for animals to be used for scientific research purposes, and also washing machines of lower dimensions which, in the sector of pharmaceutical production are defined "bin washing", it must be taken into account that the racks whereon the objects to be washed are positioned, for example the "presentation racks", as defined in the sector of pharmaceutical research, are quite big and their dimensions are nearly as large as those of the washing chamber.

Depending on the production requirements, the racks serving the machine may be present in several units.

Within the washing areas, these racks are normally parked in front of the machine, whether because they have just been manually extracted from the washing chamber by the operator at the end of a cycle or because they have been loaded with dirty objects to be washed and are ready to be manually introduced into the washing chamber by the operator.

The need for parking spaces for the racks is even more felt and critical when the washing machines are to be equipped with automated systems in order to reduce the presence and intervention of operators.

In new buildings intended for washing areas in the fields of pharmaceutical research and production, such spaces may also be created at different underground levels, in rooms with no natural lighting and air change.

In some countries, very restrictive laws are in force which forbid the personnel to remain in closed environments longer than a certain number of hours.

There are also other reasons that lead to reduce the operator's intervention, such as, for example, exposition to and contact with materials that may be bacteriologically infected or dangerous for direct human contact and hence harmful for the operator's health.

The various phases of the washing processes should also be taken into account, which are critical as regards operator control.

Let us consider, as a non-limiting example, a "rack washer" machine provided with a large washing chamber.

The load to be washed is arranged on "presentation racks" made of stainless steel, the size and weight thereof are sometimes considerable, and which must be pushed manually into the chamber at the beginning of the cycle or removed from the washing chamber at the end of the cycle.

In addition to the physical effort required during the removal phase, there is also the inconvenience of coming in contact with metal parts and vapours at high temperatures following the washing bath treatment (where temperatures as high as 85° C. can be reached) or with hot air used for drying the load. The operator must wear suitable protective devices, such as insulating gloves, boots, etc.

One process automation technique known in the art uses AGV (Automated Guided Vehicle) systems. These are automatically guided trolleys used for transporting various objects from one place to another. In the specific non-limiting case of a "rack washer" machine like the one mentioned above, AGV systems could be used for moving the presentation racks within the animal breeding department and for handling the loading and unloading thereof from one or more rack washers in the washing area.

However, these trolleys need spaces where they can be parked, awaiting to be used for loading/unloading the "rack washer".

If we consider a known "rack washer" with manually controlled doors, two known types of doors are normally used:

A) Doors hinged on one side
B) Laterally sliding doors

These two types of doors are also used on the "bin washing" washing machines in the field of pharmaceutical production.

With reference to FIG. 1, in the former case of a door 11 hinged on one side of the washing machine 12, when the door is opened it will occupy the space in front of the loading/unloading door of the washing chamber, which space could be used for parking the presentation racks, or the racks transporting the frames carrying the parts to be washed destined to the pharmaceutical production.

With reference to FIG. 2, also in the latter case of a laterally sliding door 21 of the washing machine 22, the system will occupy additional lateral space, necessary to allow the door to translate, thus limiting the possibilities of insertion of the machine in the layouts of the washing areas.

If we also consider the use of the AGV automated transport system, this system requires that the "rack washer" machine be equipped with automatically opening doors for handling the steps of loading and unloading the presentation rack.

In order to implement an automated door opening system in a traditional washing machine with manually controlled doors hinged on one side, it would be natural to employ an automatic door control device for obtaining a rotation of at least 90°. However, such a system would occupy the space in front of the door, which space could be used for parking the AGV trolley, or, more generally, for parking the trolleys.

Even considering a manually controlled sliding door, it would be natural to employ an automatic door control device for describing a translation to the right or left side. However, also this system would occupy additional lateral space necessary for the translation.

It should also be taken into consideration that the doors of the most advanced washing machines known in the art provide hermetic sealing obtained by means of gaskets inflatable with compressed air, closed as a loop and inserted in the thickness of the door along the whole outer perimeter thereof (see FIG. 3).

The gasket 31 is housed in a suitable cavity in the thickness of the door 32 and, once inflated, pushes against the frame, thus providing hermetic sealing against any leakage of vapours and washing bath.

Hinged doors are the best solution for ensuring hermetic sealing by means of inflatable gaskets.

On the contrary, the sliding doors used in the washing machines are not suitable for ensuring hermetic sealing, and are generally employed wherever it is sufficient to prevent spraying of washing bath, through the use of simple lip-type gaskets applied onto the front side of the door frame.

In the washing chambers of large dimensions, as for example the "rack washer", another drawback of sliding doors is that it is necessary to make in the floor, along the whole part involved in the sliding action of the door, a channel to allow the door to translate. It is evident that this channel creates an interruption in the sliding plane for the racks when loading/unloading the machine. This interruption must be compensated for by means of a device of some sort, however resulting in mechanical complexity and additional costs.

Moreover, an automatic door control system will have to take into account the presence of the inflatable gasket and the door thickness.

SUMMARY OF THE INVENTION

It is therefore one object of the present invention to provide a device for opening/closing a door of a washing machine, particularly for washing equipment used in the field of pharmaceutical research and/or pharmaceutical production, and a machine comprising said device, which can overcome all of the above-mentioned drawbacks.

It is one object of the present invention to provide an automatic system for opening/closing a door of a washing machine which allows preserving the spaces in front of it for moving and parking the racks, e.g., AGV trolleys or "presentation racks", or racks transporting the trolleys carrying the parts to be washed and destined to the pharmaceutical production.

It is another object of the present invention to provide a system for opening/closing a door of a washing machine which aims at reducing to a minimum the space occupied when moving the door.

According to the basic feature of the present invention, the opening/closing system is characterized by the fact that a lateral rotational-translational motion is imparted to the door of the washing machine, relative to the front wall of the washing machine.

The present invention relates to a washing machine adapted for washing equipment used in the field of pharmaceutical research and/or pharmaceutical production, comprising an inner compartment and a front wall comprising a door allowing access to said inner compartment and a device for opening/closing said door, characterized in that said device for opening/closing the door comprises means for imparting a lateral rotational-translational motion to the door relative to the front wall of the washing machine, thereby effecting said opening/closing action.

The present invention also relates to a device for opening/closing the door, which is adapted to impart said rotational-translational movement to the door in order to effect said opening/closing action.

It is a particular object of the present invention to provide a device for opening/closing a door of a washing machine, particularly for washing equipment used in the field of pharmaceutical research and/or pharmaceutical production, and a machine comprising said device, as set out in the claims, which are an integral part of the present description.

BRIEF DESCRIPTION OF THE DRAWINGS

Further objects and advantages of the present invention will become apparent from the following detailed description of a preferred embodiment (and variants) thereof referring to the annexed drawings, which are only supplied by way of non-limiting example, wherein:

FIGS. 1, 2 and 3 show some schematic representations of prior-art door opening systems;

In the drawings, the same reference numerals and letters identify the same items or components.

DETAILED DESCRIPTION OF SOME EMBODIMENTS

Figure 4:
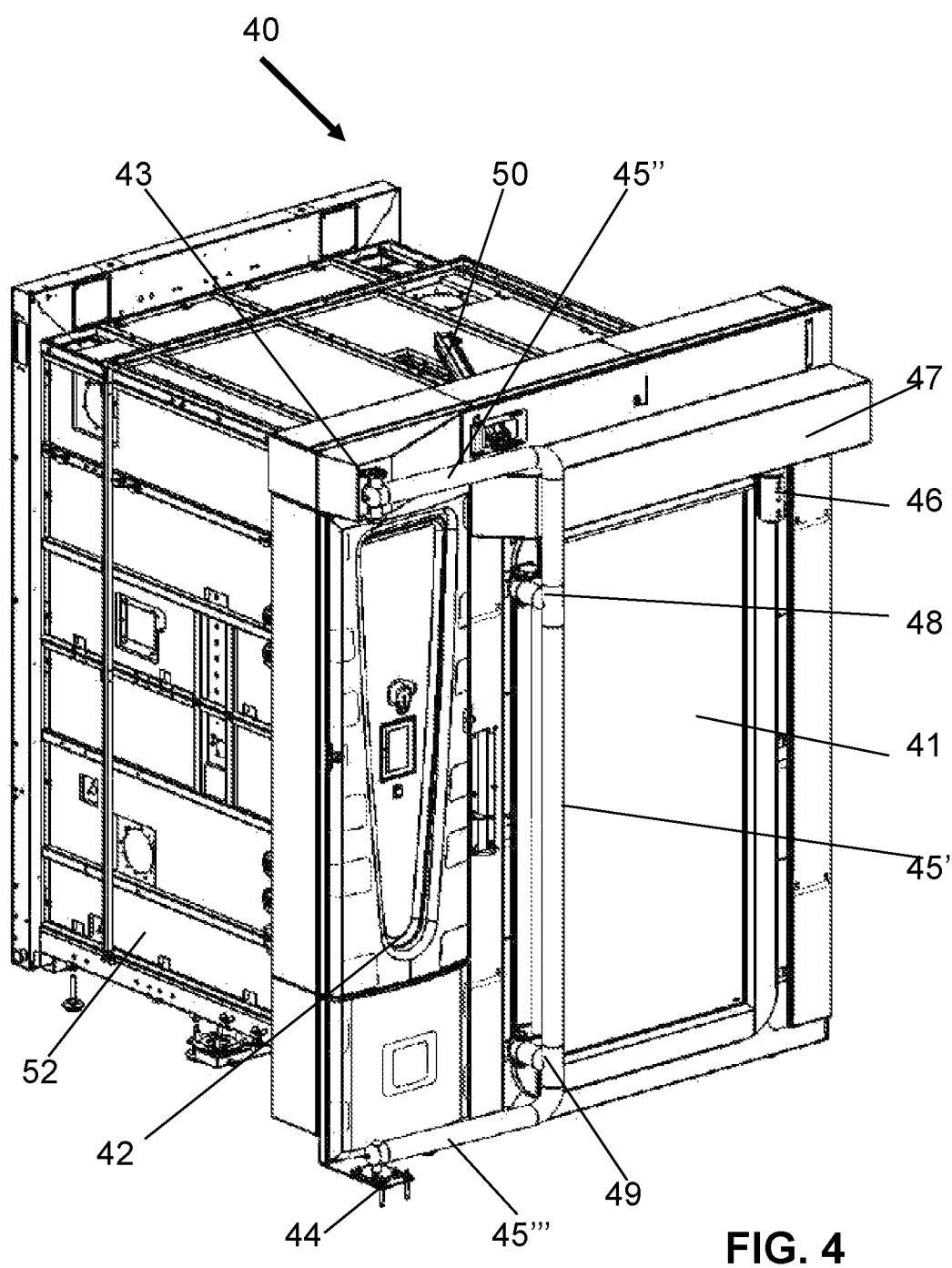
FIGS. 4 and 5 highlight two perspective views of a washing machine comprising the door and the opening/closing system in accordance with the invention.
Figure 5:
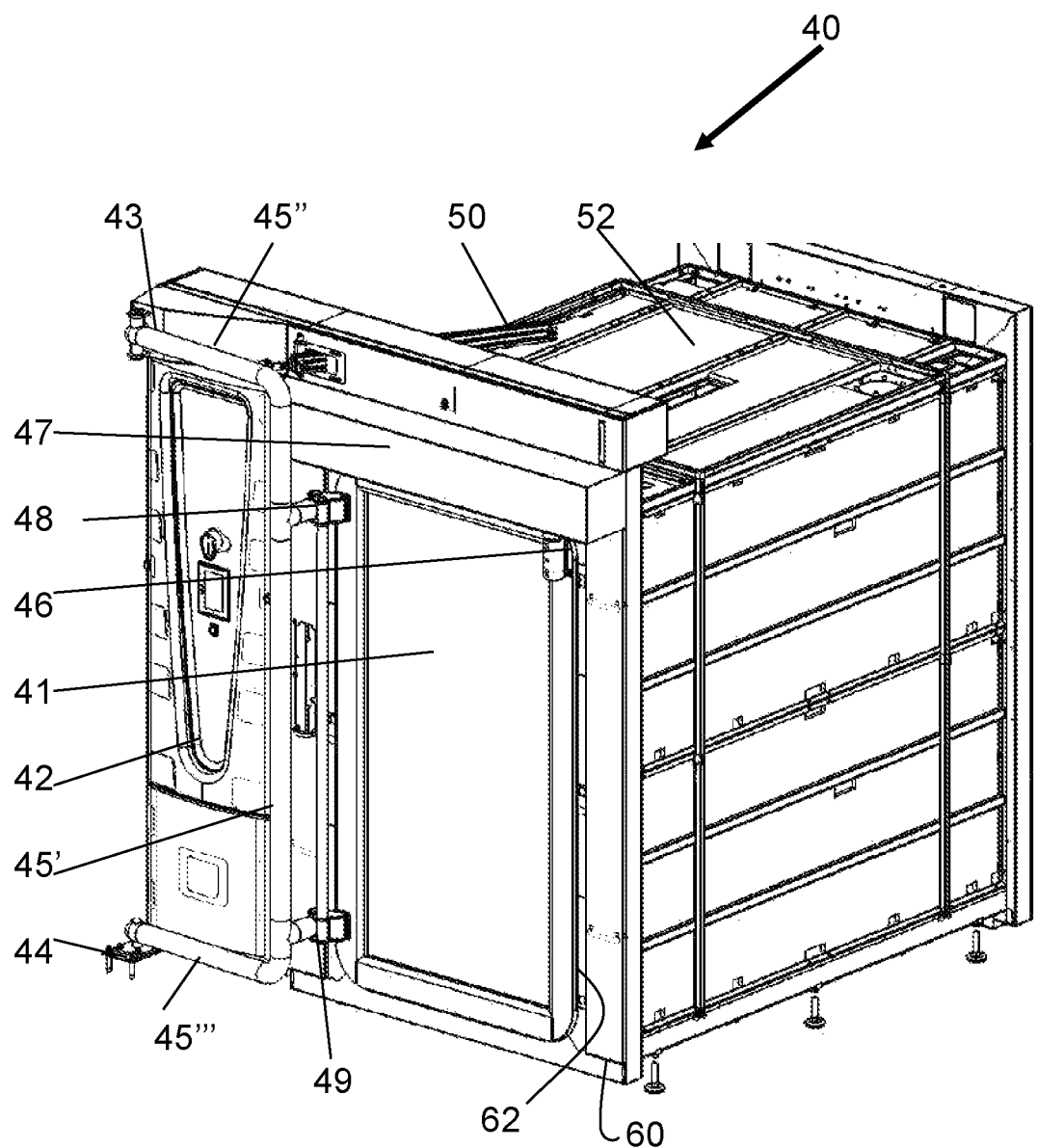

FIGS. 4 and 5 show an example of embodiment of a washing machine 40 of the "rack washer" type, which comprises a front part with a door 41.

On one side of the front part, e.g., the left one, beside the door, there is an extension of available space 42, e.g., for housing an electric cabinet.

Beside the available space 42, in the part remote from the door side, there are two hinges 43 and 44 at the top and bottom ends, to which two corresponding ends of a U-shaped handle are hinged, which handle may be made, for example, from a circular tube section, and can be gripped by an operator in case of manual opening. The handle preferably extends throughout the width of the lateral space 42, so that its central part 45', which develops substantially vertically, is located in proximity to the near side of the door 41, and thus said ends are cantilevered relative to the door side. To both ends of the central part 45' two handle extensions 45", 45'" are connected, which terminate at said top and bottom ends.

In its upper part, the door 41 is hinged on the side opposite to the handle side by means of an additional hinge 46. The axis of rotation of the hinge 46 slides in a horizontal guide 47 parallel to the front side of the machine and situated in proximity to the upper part of the door, in particular above the door, so as to not interfere with the opening and closing movements of the latter.

The door part on the side of the handle is connected and hinged to the latter by means of fastening elements, e.g., two round tube sections 48, 49.

Figure 9:
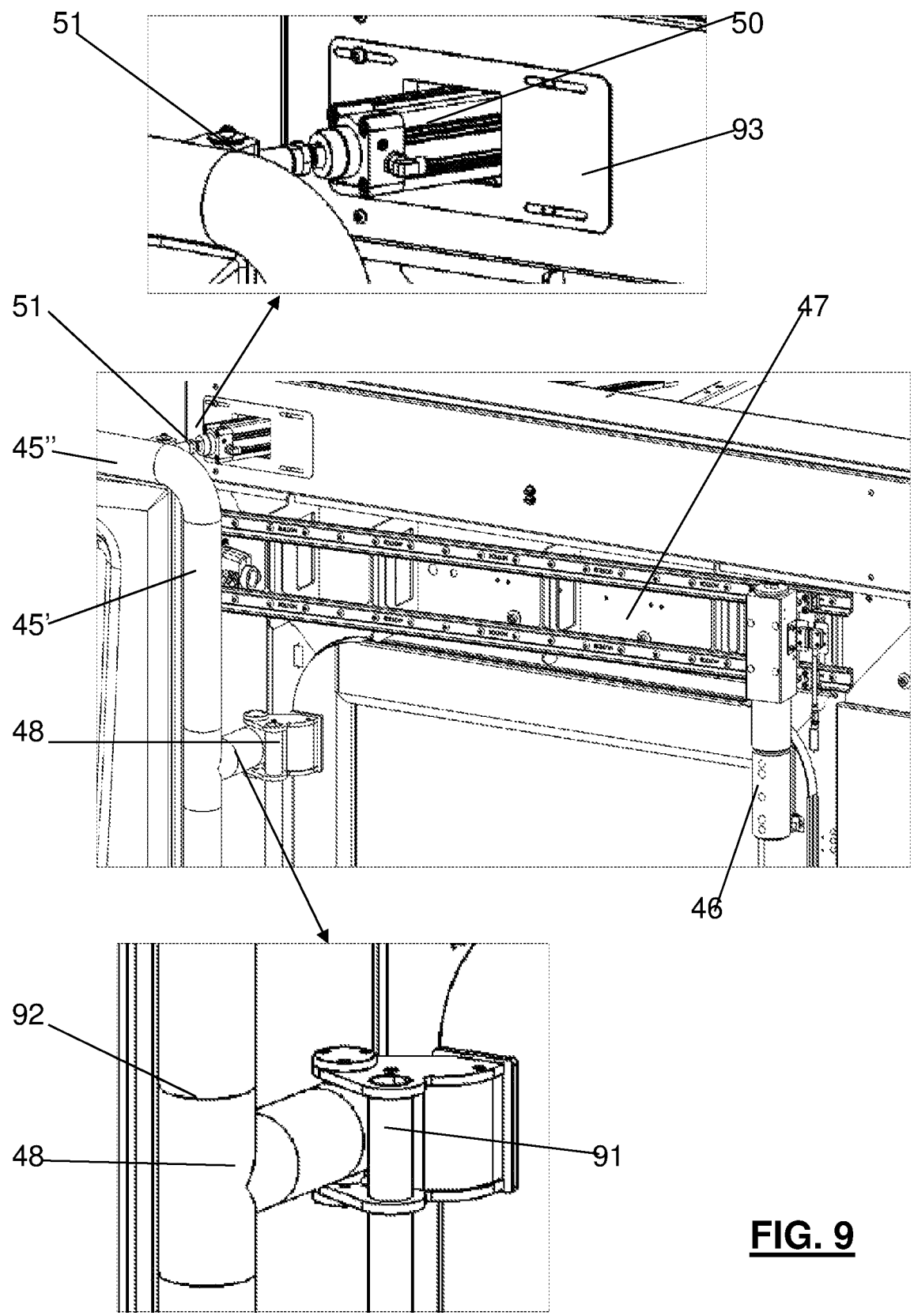
FIG. 9 shows details, some of which magnified, of some elements of the front wall of the washing machine.

As can be seen in the details of FIG. 9 concerning the fastening element 48, the fastening elements comprise a hinge 91 on one side, to which the door is connected, while on the other side they are fixed to the handle, e.g., by a weld 92.

Figure 6:
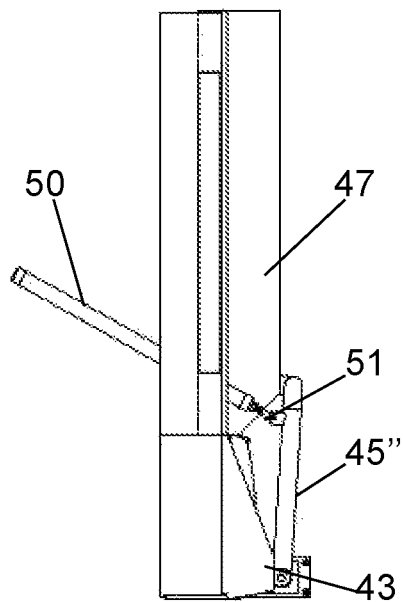
FIGS. 6, 7 and 8 show some schematic top-view representations of the door opening/closing system in accordance with the invention in three positions, i.e., with the door closed, partially open and fully open.
Figure 8:
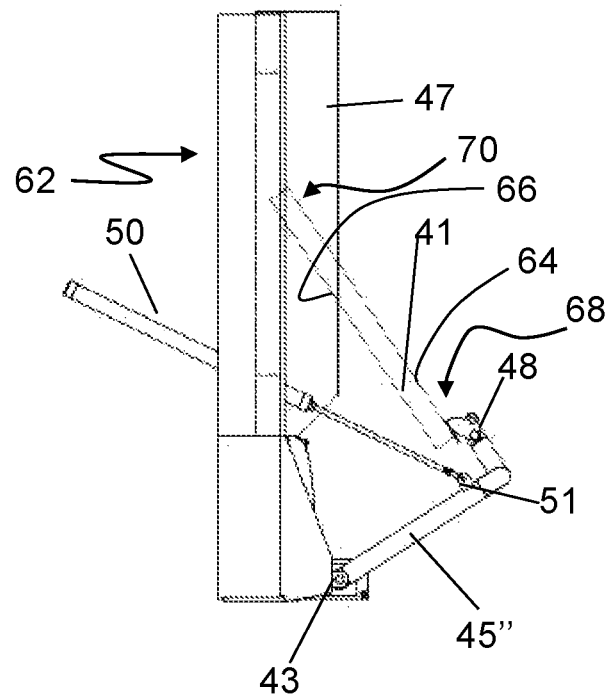
Figure 7:
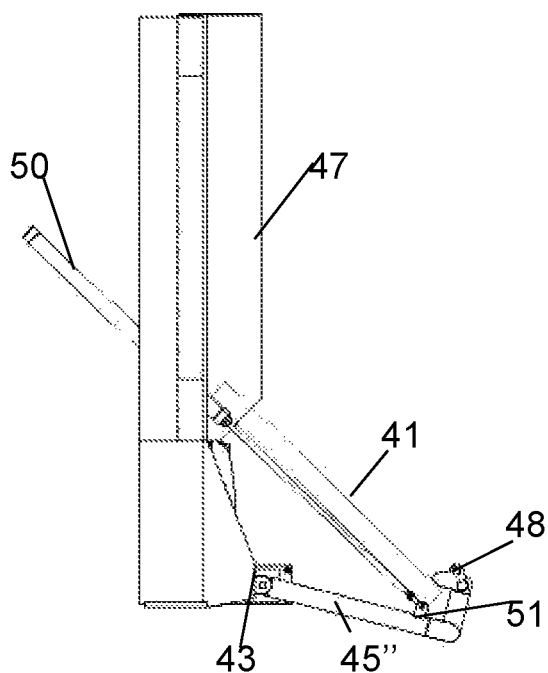

In the kinematic schemes highlighted in FIGS. 6, 7 and 8 one can see that the rotation of the handle causes the door to make a lateral rotational-translational movement, going from a closed position (FIG. 6) to a fully open position (FIG. 8) with a final angle in excess of 90°, without occupying the space in front of the washing chamber. The lateral rotational-translational movement thus determines the translation of one side of the door along the front wall through the hinge 46 and the horizontal guide 47, and the rotation of the opposite side of the door as a consequence of the rotation of the handle connected thereto.

FIG. 7 shows the maximum space occupation in front of the machine, which extends substantially laterally from the door, while the front area remains substantially clear.

An automated system for opening/closing the door may be present, which can be implemented in different ways. In this specific case, it is preferable to use a pneumatic cylinder 50, the stem of which is fixed to the handle by means of a hinging system 51. The attachment point between the hinge and the handle may be located at the junction between the vertical central side 45' and the upper extension 45".

The cylinder body is arranged horizontally on the roof of the chamber of the machine and is secured thereto by means of a hinge 93 placed in a suitable position. The movement thereof is so effected as to not interfere with the opening and closing movement of the door. In FIG. 8 it can be seen, for example, that when the door is fully open the cylinder is in a position beside the door wall external to the washing chamber. Moreover, the cylinder is located in the interspace between the top walls of the internal body 52 and of the external covering (not shown in the drawings) of the washing machine, so as to not interfere with the body of the machine (see FIG. 4).

The advantages of the pneumatic cylinder in terms of costs and implementation over other systems, such as, for example, an electrically controlled ratiomotor placed on the axis of rotation of the handle, can be easily demonstrated.

In view of the foregoing and as depicted in FIG. 5, it is understood that washing machine 40 includes a washing compartment or inner compartment and a front wall 60. Front wall 60 comprises door 41 that allows access to the inner compartment through an access opening 62. As best shown in FIG. 8, door 41 has a front face 64 and an opposing back face 66 that extend between a first side 68 and an opposing second side 70. Door 41 covers access opening 62 when door 41 is in the closed position (FIG. 5) and at least partially uncovers access opening 62 when door 41 is in the open position (FIG. 8).

The washing chambers of the washing machines are usually equipped with devices for extracting, by means of centrifugal fans, the vapours and fumes generated during the washing phases.

The extraction devices cause an internal pressure drop on the chamber walls, including the doors.

In order to prevent vapours from leaking out of the washing chamber and saturating the environment, the vapour extraction phase is kept active also while opening the door.

The internal depression in the chamber creates a force of as much as many kilograms, which can be easily overcome through the use of a pneumatic cylinder of acceptable size, whereas a ratiomotor to be applied to the axis of the handle would require a very high torque, resulting in an excessively large and expensive system.

The above-described non-limiting example of embodiment may be subject to variations without departing from the protection scope of the present invention, including all equivalent designs known to a man skilled in the art.

The elements and features shown in the various preferred embodiments may be combined together without however departing from the protection scope of the present invention.

The advantages deriving from the application of the present invention are apparent, as described below by way of example.

With this invention, in front of the door of the washing machine, room is available for parking the trolleys or, when an automated loading/unloading system is used, for parking the AGV automatic trolley with its "presentation rack".

The device can be used with traditional, non-automated machines, thus allowing the operator to open/close the door manually, or with machines automated by means of AGV devices.

With automated machines, moreover, in case of emergency, the automatic management can be bypassed and the door can be opened/closed manually by the operator.

The advantages of the present invention also include the fact that it allows the use of the hermetic sealing concepts of hinged doors as described above, while at the same time also permitting the translational motion without requiring the creation of a sliding channel in front of the door, as it happens for the washing machines of large dimensions.

From the above description, those skilled in the art will be able to produce the object of the invention without introducing any further construction details.

What is claimed is:

1. A washing machine adapted for washing equipment used in the field of pharmaceutical research and/or pharmaceutical production, comprising:

an inner compartment and a front wall comprising a door allowing access to the inner compartment through an access opening, the door having a front face and an opposing back face that extend between a first side and an opposing second side, the door covering the access opening when the door is in a closed position and at least partially uncovering the access opening when the door is in an open position;

a device for opening/closing the door, the device for opening/closing the door comprising a system configured for imparting a lateral rotational-translational motion to the door relative to the front wall, thereby effecting an opening/closing action, the system for imparting a lateral rotational-translational motion being configured to rotate the first side of the door so that the first side is moved outward away from the front wall as the door is moved from the closed position to the open position, and is configured to translate the second side of the door laterally relative to the front wall as the door is moved from the closed position to the open position; and a handle for use in automated opening and closing of the door, the handle having a first portion hingedly coupled to the front wall and a second portion that is hingedly coupled to the first side of the door, the first portion being spaced apart from the second portion.

2. The washing machine according to claim 1, further comprising an automated system for opening/closing the door, the automated system being connected to the handle.

3. The washing machine according to claim 1, wherein the system configured for imparting a rotational-translational motion to the door comprises:
the handle, the handle is U-shaped and comprises a central part forming the second portion and ends forming the first portion, the ends hinged to the front wall via a first hinge arranged in a laterally cantilevered position relative to the door;
a second hinge providing a connection between the first side of the door and the central part of the handle;
a third hinge arranged at an upper end of the door on the second side, the third hinge sliding in a horizontal guide parallel to the front wall of the machine and situated on an upper part of the door;
wherein rotation of the handle about the first hinge causes the rotational-translational motion for opening/closing the door.

4. The washing machine according to claim 3, wherein the second hinge comprises fasteners shaped as tube sections, fixedly connected to the handle and hingedly connected to the door.

5. The washing machine according to claim 4, wherein the automated system for opening/closing the door comprises a pneumatic cylinder connected to the handle via a fourth hinge and to the machine via a fifth hinge.

6. The washing machine according to claim 5, wherein the pneumatic cylinder is positioned above the inner compartment of the machine.

7. A device for opening/closing a door of a washing machine adapted for washing equipment used in the field of pharmaceutical research and/or pharmaceutical production, the washing machine comprising the inner compartment and the front wall comprising the door, the device comprising the system configured for imparting a lateral rotational-translational motion to the door, as claimed in claim 1.

8. The washing machine according to claim 1, wherein the door is between the handle and the access opening when the door is in the closed position.

9. The washing machine according to claim 1, wherein the handle is U-shaped.

10. The washing machine according to claim 1, further comprising a pneumatic cylinder coupled to the handle.

11. A washing machine adapted for washing equipment used in the field of pharmaceutical research and/or pharmaceutical production, comprising:
an inner compartment and a front wall comprising a door allowing access to the inner compartment through an access opening, the door having a front face and an opposing back face that extend between a first side and an opposing second side, the door covering the access opening when the door is in a closed position and at least partially uncovering the access opening when the door is in an open position; and
a device for opening/closing the door comprising a system configured for imparting a lateral rotational-translational motion to the door relative to the front wall, the system comprising:
a handle having a first portion hingedly coupled to the front wall and a second portion that is hingedly coupled to the first side of the door, the first portion being spaced apart from the second portion; and
a hinge that hingedly couples the second side of the door to a guide disposed on the front wall, the hinge sliding laterally along the guide as the door is moved from the closed position to the open position.

12. The washing machine according to claim 11, wherein the door is between the handle and the access opening when the door is in the closed position.

13. The washing machine according to claim 11, wherein the handle is U-shaped.

14. The washing machine according to claim 11, further comprising a pneumatic cylinder coupled to the handle.

* * * * *